United States Patent [19]

Scheglov et al.

[11] Patent Number: 4,753,810
[45] Date of Patent: Jun. 28, 1988

[54] METHOD OF PROCESSING VEGETABLE STOCK

[75] Inventors: Jury A. Scheglov; Nikolai P. Koval; Leonid A. Furer; Sergei Y. Zargarian; Anatoly A. Skimbov, all of Kishinev; Vladimir G. Belik; Boris N. Zharik, both of Kiev; Andrei Y. Papchenko, Kishinev; Filipp G. Ryabinsky, Nikolaev; Alexandr S. Sergeev, deceased, late of Simferopol, all of U.S.S.R., by Galina A. Sergeeva, administrator

[73] Assignee: Institut Prikladnoi Fiziki Akademii Nauk Moldav-Shoi SSR, Kishinev, U.S.S.R.

[21] Appl. No.: 863,074

[22] Filed: May 14, 1986

Related U.S. Application Data

[63] Continuation of Ser. No. 491,169, May 3, 1983, Pat. No. 4,608,920.

[51] Int. Cl.$^4$ ................................................ A23L 3/32
[52] U.S. Cl. .................................... 426/238; 426/244
[58] Field of Search .................. 426/238, 244; 99/451, 99/483, 516; 219/288

[56] References Cited

U.S. PATENT DOCUMENTS

| 337,334 | 3/1886 | Jones et al. | 99/451 |
| 1,162,213 | 11/1915 | Bloom | 99/451 X |
| 4,386,110 | 5/1983 | Komeyasu et al. | 426/244 |
| 4,457,221 | 7/1984 | Geren | 99/516 X |

FOREIGN PATENT DOCUMENTS

| 100094 | 1/1954 | U.S.S.R. |
| 428737 | 5/1974 | U.S.S.R. |

Primary Examiner—George Yeung
Attorney, Agent, or Firm—Fleit, Jacobson, Cohn & Price

[57] ABSTRACT

An electroplasmolyzer for processing vegetable stock comprises a housing which accommodates therein electrodes provided with a plane surface of contact with vegetable stock being processed, said electrodes connected to a power supply. Adjacent electrodes in each pair thereof are connected to different phases of the power supply. The use of the herein disclosed electroplasmolyzer in a production line for primary processing of vegetable stock results in an increased efficiency of pressing equipment and higher yield of juice from vegetable stock.

14 Claims, 3 Drawing Sheets

METHOD OF PROCESSING VEGETABLE STOCK

This is a continuation of application Ser. No. 491,169 filed May 3, 1983, now U.S. Pat. No. 4,608,920.

TECHNICAL FIELD

The present invention relates to the processing of foodstuffs and, more particularly, it relates to an electroplasmolyzer for processing vegetable stock.

The present invention may be employed in production lines for primary processing of fruit, vegetables and root crops to prepare juice, pulp or plasmolyzed shavings.

BACKGROUND OF THE INVENTION

Known in the prior art is an electroplasmolyzer (cf., U.S.S.R. Inventor's Certificate No. 428,737, Int. Cl. 2 A 23 N 1/00, 1972) for processing vegetable stock, comprising a rectangular housing with inlet and outlet openings, accommodating thereinside two perforated plate electrodes mounted in parallel with the longitudinal axis. Provided between side walls of the housing and the perforated electrodes are narrow spaces designed to be filled with juice fed by gravity.

Said prior art electroplasmolyzer fails to ensure complete and uniform processing of comminuted vegetable stock and provides no possibility of uniformly loading the power supply phases.

Closest of all to the herein disclosed electroplasmolyzer by its technical essence is a multielectrode electroplasmolyzer (cf., U.S.S.R. Inventor's Certificate No. 100.094, Cl. 53 K 1/01) comprising a rectangular housing made of dielectric, on whose top and bottom walls rod electrodes are located uniformly and flush with the wall surface, said electrodes extending at right angles to the longitudinal axis of the housing. The housing is provided with an inlet opening for vegetable pulp and with an outlet opening for the discharge of electrically processed stock.

Such an apparatus provides for uniform loading of the power supply phases and uniform density of electric current across the electrodes while the process of electroplasmolysis proceeds without overheating the product being processed.

The mass of raw stock moves by gravity in an inclined electrode channel since no provision is made in the apparatus for pulp-pushing means. This results in a pulsating movement of vegetable stock in the electrode channel, while the small area of contact surface of electrodes along the generatrix of round rods fails to ensure uniform processing of comminuted mass and affects the yield of juice therefrom. Moreover, the travel rate of the mass does not agree with the current density across the electrodes and depends upon the angle of inclination of the electroplasmolyzer housing.

BRIEF DESCRIPTION OF THE INVENTION

It is the object of the present invention to develop an electroplasmolyzer capable of ensuring a uniform electric processing of comminuted vegetable stock, improving the cell permeability of the latter and increasing the yield of juice therefrom.

The problem of the invention is solved owing to the fact that, in an electroplasmolyzer for processing vegetable stock, comprising a housing which has an inlet opening and an outlet opening and accommodates thereinside electrodes connected to a power supply, according to the present invention, the electrodes having a plane surface of contact with vegetable stock being processed are distributed uniformly over the entire inner surface of the housing while adjacent electrodes in each pair thereof are connected to different phases of the power supply.

It is expedient that some electrodes provided with a plane surface of contact with vegetable stock being processed be positioned on two opposite walls of the housing across the entire width of said walls while other electrodes provided with a plane contact surface of identical shape and having chamfered ends on the side of the inlet opening of the housing be positioned between said former electrodes on two other walls of the housing and spaced from each other at a distance equal to 0.2-0.4 width of one of the electrodes positioned across the entire width of the walls, a gap being formed between the end faces of the electrodes of identical shape, said gap being equal to 0.2-0.4 width of one of the electrodes positioned across the entire width of the housing wall.

It is possible that some square-shaped electrode having a plane surface of contact with vegetable stock being processed be positioned on three walls of the housing while other electrodes with a plane contact surface of identical shape be positioned on a fourth wall at a distance between the electrodes equal to 0.2-0.4 width of the square-shaped electrode, the ends of the electrodes of identical shape being chamfered on the side of the inlet opening of the housing.

It is likewise expedient that the distance between the electrodes be selected on the basis of the relationship $d/\Delta = N-2$, with due regard for the inequality $E_{min} \leq \leq V/\Delta \leq E_{max}$,
where
- $d$—width of the wall to which the electrodes of identical shape are attached,
- $\Delta$—distance between the electrodes,
- $N$—total number of electrodes,
- $V$—voltage of the power supply,
- $E_{min}, E_{max}$—minimum and maximum values of electric field intensity, respectively.

It is further desirable that the distance between the electrodes be selected on the basis of the relationship $d/\Delta = N-1$, with due regard for the inequality $E_{min} \leq V/\Delta \leq \leq E_{max}$,
where
- $d$—width of the wall to which the electrodes of identical shape are attached,
- $\Delta$—distance between the electrodes,
- $N$—total number of electrodes,
- $V$—voltage of the power supply,
- $E_{min}, E_{max}$—minimum and maximum values of electric field intensity, respectively.

It is expedient that the ends of the electrodes of identical shape be chamfered on the side of the inlet opening of the housing at an angle of 30°-60° to the longitudinal axis of the housing while the outlet opening of the housing be provided with a regulating valve.

It is desirable that the electrodes having a plane surface of contact with vegetable stock being processed be distributed uniformly over the entire inner surface of the housing provided with a movable casing and including at least three sections, the cross-sectional area of each subsequent section being greater than that of the preceding section, with some electrodes having a plane contact surface in each one of the housing sections being positioned on two opposite walls at right angles to the longitudinal axis of the housing and their number being divisible by three and other electrodes having a plane contact surface in each one of the housing sections being positioned in parallel with the longitudinal axis of the housing on two other walls and the number of said latter electrodes being divisible by three, and that two rows of jet injectors be provided between said latter electrodes in two sections of smaller cross-sectional areas.

It is possible that the jet injectors be connected to different phases of the power supply.

It is expedient that the sector-shaped electrodes having a plane surface of contact with vegetable stock being processed be uniformly arranged at an angle of 120° to each other on the inner surface of the housing and that the electrodes having a plane contact surface be mounted equidistantly between said former electrodes at an angle of 120° to each other, the housing being cylindrical in shape, and that the electrodes on the side of the inlet and outlet openings have their ends chamfered with respect to the longitudinal axis of the housing, a gap between the end faces of the electrodes with plane contact surface being equal to the distance between the sector-shaped electrodes and electrodes with plane contact surface.

The use of the herein disclosed electroplasmolyzer in a production line for primary processing of apples to juice results in the maximum destruction of the cytoplasm of cells which were left intact as a result of mechanical comminution of stock. This is accompanied by an increase of the efficiency of batch-operation pressing equipment and by a rise in the yield of apple juice of up to 5%. When processing machine-harvested black ashberry and tomatoes, the yield of juice rises by up to 10%.

Owing to an increased yield of juice, the apple marc contains a smaller amount of moisture and, therefore, the fuel consumption when drying them is reduced by 0.1 while the rate of drying increases. In the electroplasmolyzer, the vegetable pulp is processed in the course of fractions of a second, with the sugars, acids and vitamins of the starting product being fully converted to juice.

The electric processing is rather effective when processing the grape pulp and sugarbeet shavings. Isabella grapes after crushing are pretreated with ferments or heat-treated for 12-48 hours; it is only after such processing that the must is extracted. This process involves considerable consumption of manual labor, the use of numerous containers and requires substantial working area. Upon electric processing of grapes, the gravity yield of must increases by up to 6%, and the process of must extraction is continuous.

The electric processing of sugarbeet shavings provides a possibility of improving the quality of diffusion juice, reduce the thermal energy consumption and increase the sugar yield by 0.5%.

The electroplasmolyzer of the invention needs no continuous supervision and is reliable in operation. The electric power consumption does not exceed 2 kW/h per ton of vegetable stock.

Small overall dimensions of both the electroplasmolyzer for fruit processing and its power supply facilitate their transportation by air through considerable distances.

BRIEF DESCRIPTION OF THE DRAWINGS

The invention will be made apparent upon considering the following detailed description of an exemplary embodiment thereof, with due references to the accompanying drawings in which.

DETAILED DESCRIPTION OF THE INVENTION

Figure 1:
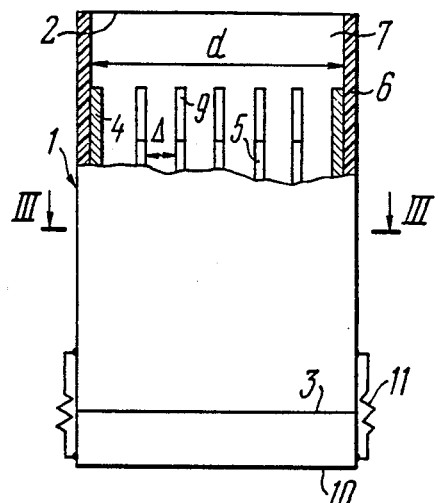
FIG. 1 is a general view of an electroplasmolyzer for processing vegetable stock, having a rectangular housing with two rows of electrodes of identical shape, according to the present invention.

Referring now to FIG. 1 of the accompanying drawings, a rectangular housing 1 of the herein disclosed electroplasmolyzer is made of a dielectric and has an inlet opening 2 and an outlet opening 3. Positioned inside the housing 1 in parallel with the longitudinal axis thereof are some electrodes 4 and other electrodes 5, having a plane surface of contact with vegetable stock being processed (not shown in the drawing). Two electrodes 4 are attached to walls 6 across the entire width thereof while the electrodes 5 of identical shape are attached to two other opposite walls 7.

The uniform distribution of the electrodes 5 inside the electroplasmolyzer housing 1 is provided for by the relationship $d/\Delta = N - 2$, with due regard for the inequality $E_{min} \leq V/\Delta \leq E_{max}$, where $E_{min}$—minimum value of electric field intensity;

$E_{max}$—maximum value of electric field intensity;

d—width of the wall 7 to which the electrodes 5 are attached;

$\Delta$—distance between the electrodes 5;

N—total number of the electrodes 4, 5;

V—voltage.

The V/Δ ratio characterizes the value of electric field intensity. Therefore, at values below 50 V/cm there is observed a sharp increase of the amount of time required for electric processing of vegetable mass, whereas values above 400 V/cm can only be attained with the aid of special transformer means for increasing the voltage applied to the electroplasmolyzer.

The minimum value of electric field intensity for flow processing of vegetable stock is $E_{min}=50$ V/cm. The maximum value of electric field intensity, $E_{max}=400$ V/cm, is obtained from commercial-frequency a.c. mains without the use of transformer means.

It follows from the relationship $d/\Delta=N-2$ that the distance between the electrodes 5 should be selected in the range of from 20 to 40 mm. For example, given the width of the wall 7 with the electrodes 5 of d=280 mm and the distance between the electrodes 5 of $\Delta=40$ mm, the number of the electrodes 5 equals $280/40=7-2=5$. A reduction of the distance between the electrodes 5 to a value less than 20 mm may result in the sticking of vegetable mass between the electrodes 5 while an increase of said distance to a value over 40 mm will require higher values of electric field intensity which can only be attained with the aid of special transformer means increasing the voltage across the electroplasmolyzer.

Figure 2:
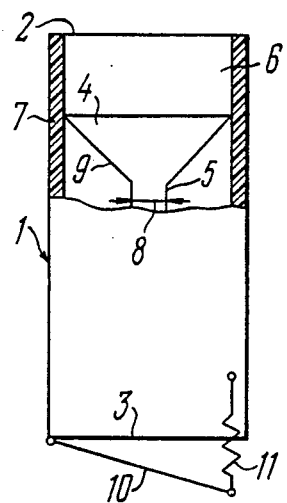
FIG. 2 is a side view of an electroplasmolyzer with a regulating valve on the outlet opening of the housing, according to the present invention.

FIG. 2 is a side view of the electroplasmolyzer housing 1. The electrodes 5 attached to two opposite walls 7 to form a gap 8 have, on the side of the inlet opening 2, ends 9 chamfered at an angle of 30°–60° to the longitudinal axis of the housing 1. Should the angle of chamfer of the chamfered ends 9 be less than 30°, foreign matter such as leaf or straw particles may be retained on the end face of the electrode 5, while an angle of chamfer over 60° would lead to a sharp reduction of the surface of the electroplasmolyzer electrodes 5. The gap 8 between two rows of the electrodes 5 is equal to 0.2–0.4 width of one of the electrodes 4. The provision on the outlet opening 3 of a regulating valve 10 with a spring 11 ensures delivery pressure and good contact of the pulp (not shown in the drawing) with the electrodes 4, 5.

Figure 3:
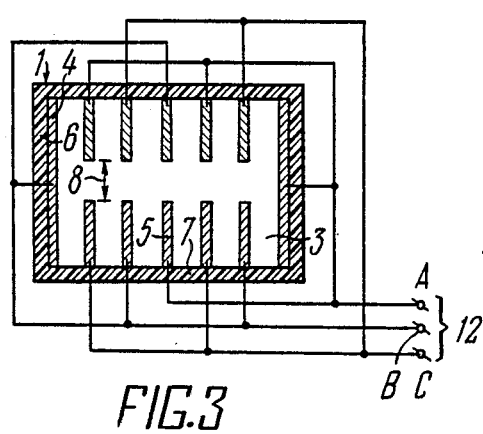
FIG. 3 shows a cross-section of the electroplasmolyzer taken along the line III—III of FIG. 1, and a circuit diagram of electrode connection to the power supply, according to the invention.

FIG. 3 shows a cross-sectional view of the electroplasmolyzer with a circuit diagram of connections of the electrodes 4, 5. Attached to the walls 6 of the housing 1 are the electrodes 4, while two rows of the electrodes 5 of identical shape are positioned on two other opposite walls 7. Provided between the rows of the electrodes 5 in the center of the housing 1 is the gap 8 equal to 0.2–0.4 width of one of the electrodes 4. The electric processing of vegetable stock is effected between the end faces of the opposite electrodes 5 since the latter are connected to different phases A, B, C of an a.c. power supply 12. A reduction of the gap 8 between the electrodes 5 to a value below 0.2 width of the electrode 4 may lead to electric breakdown of the mass of vegetable stock and, consequently, to nonuniform processing, while an increase of the gap 8 to a value in excess of 0.4 width of the electrode 4 would lead to incomplete electric processing of vegetable stock.

One of the electrodes 4 is connected to phase A, with the first column of adjacent electrodes 5 connected to phases B and C, the second column—to phases A and C, the third column—to phases A and B, the fourth column—to phases B and C, the fifth column—to phases A and C, and the second electrode 4—to phase B. The electrodes 4 and 5 are connected uniformly to all three phases A, B and C.

In view of the foregoing, the number of the electrodes 4, 5 in the electroplasmolyzer is selected such that it would be divisible by three, with each pair of adjacent electrodes 5 connected to different phases A, B, C. It is therefore that twelve electrodes 4, 5 are shown in FIG. 3, ten out of them being the electrodes 5.

Figure 4:
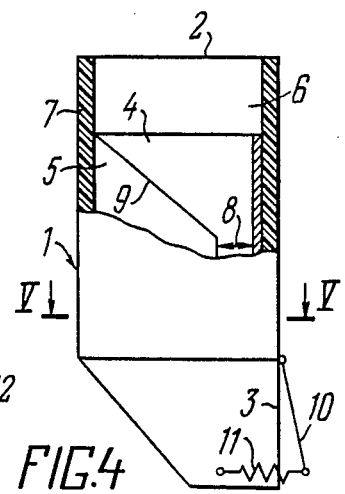
FIG. 4 is a side view of an electroplasmolyzer for processing vegetable stock, having a rectangular housing with a single row of electrodes of identical shape and with a regulating valve on the outlet opening of the housing, according to the invention.

FIG. 4 illustrates an electroplasmolyzer with a single row of the electrodes 5 (side view). The housing 1 has inlet opening 2 and outlet opening 3 provided with the regulating valve 10 and spring 11.

Attached to opposite walls 6 of the housing 1 and to one of the walls 7 is a square-shaped electrode 4 with plane contact surface. Electrodes 5 are attached to the other wall 7 and, on the side of the inlet opening 2, have ends 9 chamfered at angles of 30°–60° to the longitudinal axis of the housing 1. The provision of chamfered ends 9 of the electrodes 5 precludes fibrous foreign matter from accumulating on top end faces of said electrodes and facilitates the conveyance of such foreign matter to the gap 8 formed by the row of electrodes 5 and square-shaped electrode 4 and equal to 0.2–0.4 width of the square-shaped electrode 4.

Figure 5:
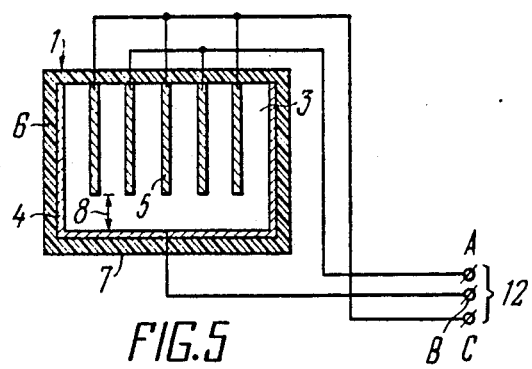
FIG. 5 shows a cross-section of the electroplasmolyzer, taken along the line V—V of FIG. 4, and a circuit diagram of electrode connection to the power supply, according to the present invention.

FIG. 5 is a cross-sectional view of the electroplasmolyzer with a single row of electrodes 5 attached to the wall 7. As a result, the gap 8 is formed between the end faces of the electrodes 5 and square-shaped electrode 4, said gap being equal to 0.2–0.4 width of the square-shaped electrode 4.

The uniform distribution of the electrodes 5 inside the housing 1 of the electroplasmolyzer is ensured by observing the relationship $d/\Delta=N-1$, with due regard for the inequality $E_{min}\leq V/\Delta \leq E_{max}$, where d—width of the wall to which the electrodes 5 are attached;

Δ—distance between the electrodes 5;

N—total number of the electrodes 4, 5;

V—voltage of the power supply 12;

$E_{min}$—50 V/cm, $E_{max}=400$ V/cm.

Comminuted vegetable stock is fed continuously from a crusher to the electroplasmolyzer housing 1 to be processed between the electrodes 4 and 5 and in their gap 8.

The circuit diagram of connections of the electrodes 4 and 5 is made three-phase, with the adjacent electrodes 5 connected to different ones of the two phases A and C of the power supply 12, and the square-shaped electrode 4—to phase B. In so doing, there is ensured a uniform and more complete processing of vegetable stock between the electrodes 4 and 5 since adjacent electrodes 4, 5 in each pair thereof are connected to different phases A, B, C of the power supply 12. It should be noted that no deviations are permitted from the specified values of the angle of chamfer of the ends 9 of the electrodes 5 and of the gap 8, as in the case of the electroplasmolyzer shown in FIGS. 2 and 3.

Figure 6:
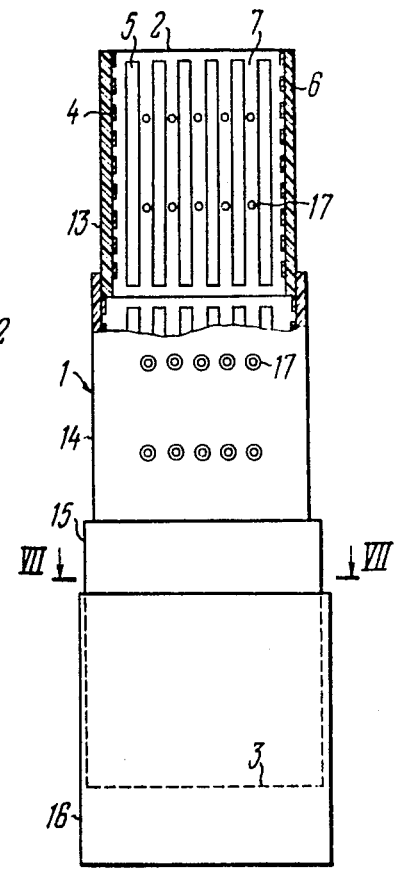
FIG. 6 is a general view of an electroplasmolyzer for processing vegetable stock, with a housing having three sections and a movable casing, according to the present invention.

FIG. 6 is a general view of an electroplasmolyzer with inlet and outlet openings 2 and 3, rectangular housing 1 including at least three sections 13, 14 and 15 and a movable casing 16.

Each one of the sections 13, 14, 15 has walls 6 with electrodes 4 positioned at right angles to the longitudinal axis of the electroplasmolyzer housing 1 and walls 7 with electrodes 5 positioned in parallel with the longitudinal axis of the housing. The electrodes 4 and 5 have a plane surface of contact with vegetable stock being processed. The cross-sectional area of the sections 14 is larger than that of the section 13 while the cross-sectional area of the section 15 is larger than that of the section 14. Such an expansion of the cross-sectional area of the electroplasmolyzer towards the bottom is caused by the need to provide conditions for unobstructed conveyance of comminuted vegetable stock in the form of shavings which intertwine and form lumps readily, this possibly leading to the jamming of the narrow electrode channel.

For regulating the surface over which the shavings spread in a wide hopper of a diffuser (not shown in the drawing) upon their discharge from the housing 1 of the electroplasmolyzer via the outlet opening 3, use is made of the movable casing 16 displaceable along the longitudinal axis of the section 15.

In addition, two rows of jet injectors 17 are positioned on the walls 7 in the sections 13 and 14 of the electroplasmolyzer between the electrodes 5, said jet injectors serving to inject liquid into shavings in order to provide for better contact of vegetable stock with the electrodes 4 and 5, the number of electrodes 4, 5 in each one of the sections 13, 14, 15 being divisible by three.

Figure 7:
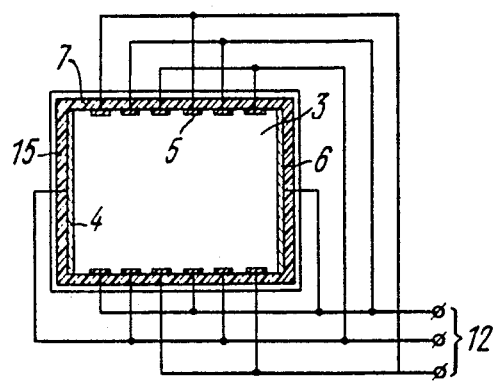
FIG. 7 is a cross-section of the electroplasmolyzer, taken along the line VII—VII of FIG. 6, with a circuit diagram of electrode connection to the power supply, according to the present invention.

FIG. 7 is a cross-sectional view of the electroplasmolyzer with a circuit diagram of connections of the electrodes 4, 5. Given the number of the electrodes 4 and 5 divisible by three, their connection alternates between three phases A, B, C of the power supply 12, thereby ensuring their uniform loading.

In the sections 13, 14, 15 of the electroplasmolyzer housing 1, adjacent electrodes in each pair of the electrodes 4 and 5 positioned on the walls 6 and 7, as well as positioned one opposite each other on the opposite walls 7, are connected to different ones of the phases A, B, C of the power supply 12, the electrodes 5 and jet injectors 17 on the wall 7 (FIG. 6) are likewise connected to different ones of the phases A (FIG. 7), B and C of the power supply 12.

The casing 16 (FIG. 6) is movable along the longitudinal axis of the section 15 of the housing 1 and, upon being adjusted at the required level, is secured in that position.

The circuit diagram of connections of the electrodes 4 and 5 (FIG. 7) is made three-phase, with the electrodes 5 having a plane contact surface being positioned on the opposite walls 7 of the housing 1. They are connected (bottom row) from left to right—the first electrode 5 to phase A, the second electrode 5 to phase B, the third electrode 5 to phase C, the fourth electrode 5 to phase A and so on. The electrodes 5 (top row) are connected as follows: the first electrode 5 to phase C, the second electrode 5 to phase A, the third electrode 5 to phase B, the fourth electrode 5 to phase A and so on; the opposite electrodes 4 positioned on the walls 6 are also connected to different phases, for example, those on the left-hand side—to phase B, and those on the right-hand side—to phase A. The electrodes 4 and 5 are connected uniformly to all of the three phases A, B and C. The jet injectors 17 (FIG. 6) are likewise alternately connected to different phases A, B, C.

Figure 8:
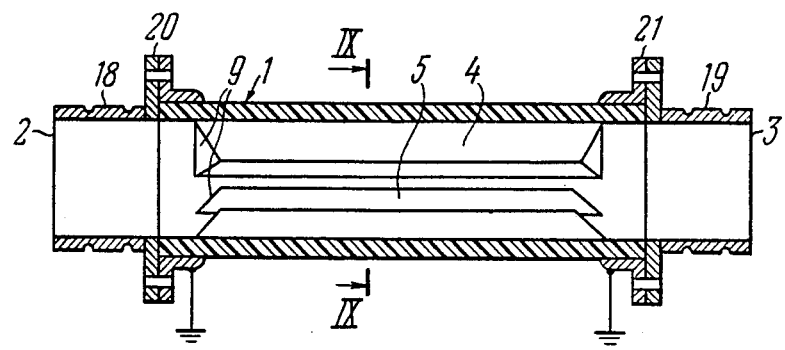
FIG. 8 is a longitudinal sectional view of an electroplasmolyzer with a cylindrical housing, according to the present invention.

FIG. 8 shows the electroplasmolyzer with a cylindrical housing 1, in longitudinal section.

The electroplasmolyzer includes the dielectric housing 1 provided with inlet and outlet openings 2 and 3. Positioned on the inner surface of the housing 1 are three sector-shaped electrodes 4 between which there are provided three electrodes 5 with plane contact surface spaced equidistantly from each other. The length of the electrodes 5 is equal to that of the sector-shaped electrodes 4. In so doing, the ends 9 of the electrodes 4, 5 are made chamfered at an angle of 45°–60° to the longitudinal axis of the housing 1 and form tapered portions designed to reduce the hydraulic resistance upon the movement of pulp.

Provided on the inlet and outlet openings 2 and 3 of the electroplasmolyzer housing 1 are connecting pipes 18 and 19 coupled to the housing 1 by means of flange joints 20 and 21; the latter flange joints are grounded. The connecting pipes 18 and 19 serve to join the electroplasmolyzer, by means of a flexible hose, to a pulp pump, or the electroplasmolyzer is directly built in a metal pulp-conveying line with the aid of welded joints in the line section between the pump and press (not shown in the drawing).

Figure 9:
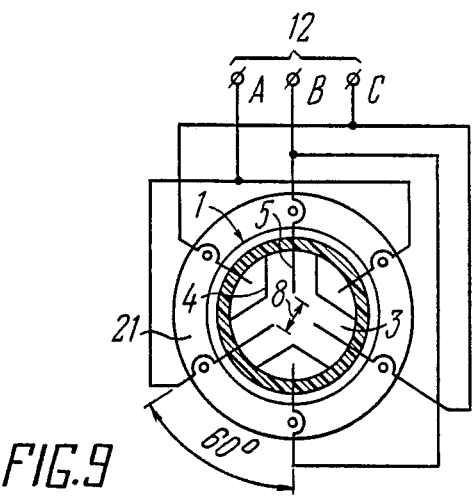
FIG. 9 shows a cross-section of the electroplasmolyzer, taken along the line IX—IX of FIG. 8, with a circuit diagram of electrode connection to the power supply, according to the present invention.

FIG. 9 is a cross-sectional view of the electroplasmolyzer comprising the cylindrical housing 1, with a circuit diagram of connections of the electrodes 4 and 5 in the case of a three-phase power supply 12.

The sector-shaped electrodes 4 and the electrodes 5 are positioned on the inner surface of the electroplasmolyzer housing 1 at an angle of 120° to each other and equidistantly from each other, the gap 8 between the edges of the electrodes 5 being equal to or less than the distance between the electrodes 5 and the sector-shaped electrodes 4. A flange 21 is attached to the housing 1.

The circuit diagram of connections of the electrodes 4 and 5 allows for the alternation of phases between the electrodes 5 with plane contact surface and sector-shaped electrodes 4. For example, the electrode 5 with plane contact surface (top center) is connected to phase B, the sector-shaped electrode 4 which follows in a clockwise direction is connected to phase A, then the electrode 5 is connected to phase C, electrode 4—to phase B, electrode 5—to phase A and so on. All six electrodes 4, 5 are uniformly distributed between the three phases A, B and C of the power supply 12.

The electroplasmolyzer according to the present invention operates in the following manner.

Comminuted vegetable stock from, say, a disk crusher (not shown in the drawing) is fed to the housing 1 (FIGS. 1, 2, 3) of the electroplasmolyzer via the inlet opening 2 and further delivered to the electrodes 4, 5 positioned equidistantly from each other and attached to opposite walls 6 and 7. In so doing, voltage from the three-phase a.c. power supply 12 is applied to the electrodes 4 and 5, and the continuously moving vegetable pulp is treated with electric current. The electric current simultaneously affects all of the vegetable cells left intact after mechanical comminution of vegetable stock and, owing to translatory vibration of ions, protein coagulates in the cytoplasm, plasma bunches are formed and channels for the outlet of cell juice.

Foreign matter carried by the stock is moved over the chamfered ends 9 of the electrodes 5 and, via the gap 8 formed by two rows of the electrodes 5, is delivered together with electrically treated pulp to the outlet opening 3 of the housing 1, to the regulating valve 10 whose expansion angle is adjusted by means of the spring 11. The regulating valve 10 makes for the development of pulp delivery pressure inside the housing 1, thereby eliminating voids in the pulp and ensuring a good contact of the pulp with the electrodes 4 and 5.

Adjacent electrodes 5, as well as electrodes 4, in each pair thereof are connected to different phases A, B, C, thereby ensuring a fuller and more uniform processing of the pulp and increased yield of juice.

The voltage from the power supply 12, applied to the electrodes 4 and 5, is adjusted depending on the type and variety of the stock being processed. For instance, summer apples are processed at lower voltage and autumn apples—at higher voltage. While so doing, the efficiency of electroplasmolysis is increased.

Analogous is the process of plasmolysis in an electroplasmolyzer featuring a somewhat different arrangement of the electrodes 4, 5 in the housing 1 (FIGS. 4, 5).

Comminuted stock from a disk crusher is fed to the housing 1 via the inlet opening 2. The pulp is distributed between the square-shaped electrode 4 and identical electrodes 5 on the walls 6 and 7 of the housing 1. While so doing, voltage from the power supply 12 is applied to the electrodes 4 and 5. The pulp comes in contact with the electrodes 4 and 5 to be subjected to the effect of electric current, which results in an increased cell permeability of the pulp and higher yield of juice upon pressing.

In case fibrous foreign matter is introduced with the stock and possibly deposit on the end faces of the electrodes 5, use is made of chamfered ends 9 provided in the electrodes 5 on the side of the inlet opening 2. Upon movement of the pulp, foreign matter slides over the chamfered ends 9 of the electrodes 5 to move down the gap 8 and to the outlet opening 3. This ensures an unobstructed movement of the pulp being processed between the electrodes 4 and 5. The delivery pressure of the pulp inside the housing 1 is ensured by the valve 10 provided with springs 11. In so doing, the pulp gets compacted and a reliable electric contact is formed between the pulp and the electrodes 4 and 5, thereby ensuring effective electric processing of the pulp and increased yield of juice. The degree of pulp delivery pressure is adjusted with the aid of the springs 11.

The electrodes 5 and the square-shaped electrode 4 are connected to different phases A, B, C and, therefore, all of the electrodes 4, 5 are working ones and the process of stock plasmolysis in the flow is continuous. The electrodes 5 inside the housing 1 provide for a large surface of contact with vegetable stock being processed, without restricting its flow area. This renders the electroplasmolyzer of the invention highly efficient and reliable in operation.

The electroplasmolyzer whose housing 1 (FIGS. 6, 7) includes sections 13, 14, 15 operates somewhat differently. Comminuted stock in the form of shavings is fed to the housing 1 via the inlet opening 2 of the section 13. The shavings fill the inner space of the housing 1 in all of the three sections 13, 14 and 15 and is distributed between the electrodes 4 and 5 attached to the walls 6 and 7. Then, the shavings go down by gravity and fill the casing 16 which assists in distributing the shavings in the hopper of a diffuser (not shown in the drawing) in the production line.

The shavings move in the housing 1 without obstruction because the constituent sections 13, 14 and 15 are arranged in a pattern of increasing cross-sectional area. Also conducive to the development of a continuous flow are jet injectors 17 through which liquid is injected for wetting the shavings. While so doing, a.c. voltage is applied to the electrodes 4 and 5 and the jet injectors 17, which affects the vegetable stock to destroy the cytoplasm in the cells, thereby facilitating water diffusion at lower temperature and reducing considerably the transition of non-sugars to juice.

Owing to sectional expansion of the housing 1, it is permitted to install the electroplasmolyzer at an angle of up to 45° to the vertical, whereby the apparatus of the invention may be used in production lines somewhat differing from each other due to possible changes in the position of production equipment.

Adjacent electrodes 4 and 5 in the sections 13, 14, 15, as well as the opposite jet injectors 17, are connected to different phases A, B, C of the power supply 12. In addition, the electrodes 5 and the jet injectors 17 positioned on the same side are likewise connected to different phases A, B, C. The casing 16 is reliably grounded. As a result, the process of electroplasmolysis of beet and like shavings in a flow is continuous. The electroplasmolyzer of the invention is mounted above the hopper of a diffuser and regulates the beet delivery pressure therein; the electroplasmolyzer further makes for a considerable increase of cell permeability, reduction on the diffusion juice temperature and improvement of quality thereof.

The electroplasmolyzer with cylindrical housing 1 (FIGS. 8, 9) works in combination with a pulp pump (not shown in the drawing). Comminuted vegetable stock such as pulp is pump-fed to the housing 1 via the inlet opening of the connecting pipe 18 coupled to the electroplasmolyzer housing 1 by means of the flange joint 20. The pulp passes round the chamfered ends 9 of the sector-shaped electrodes 4 and of the electrodes 5 to be uniformly distributed between the electrodes 4, 5. While so doing, a.c. voltage from the power supply 12 is applied to the electrodes 4, 5, and the continuously moving pulp is subjected to electric processing. The plasmolyzed pulp under pressure leaves the housing 1 through the outlet opening 3 of the connecting pipe 19 with flange joint 21 and delivered via pipeline to a drain or press (not shown in the drawing). The pulp processing takes place in a closed plasmolysis chamber inaccessible to atmospheric oxygen, thereby ruling out the sticking of vegetable stock to the electrodes 4, 5 and precluding the oxidation process.

The number of the electrodes 4 and 5 of the electroplasmolyzer is divisible by three and, therefore, they are connected to three phases A, B, C of the power supply 12, which ensures a short-duration electric processing of the pulp directly in the flow, the flow area of the electroplasmolyzer housing 1 being enlarged owing to the fact that the electrodes 5 are positioned between the sector-shaped electrodes 4, whereby the surface of contact with vegetable stock being processed can be enlarged and the apparatus capacity increased. The electric processing results in an improved permeability of cell tissue and higher yield of juice produced therefrom.

The herein disclosed electroplasmolyzer for processing vegetable stock wherein the electrodes 4, 5 are rationally positioned on the inner surface of the housing 1 makes for a more complete processing of fruit, vegetables and root crops which yield insufficient amount of juice and other nutritious substances without electric processing and retain too much moisture in the marc, as a result of which considerable amount of liquid fuel is required for drying the marc. Using the electroplasmolyzer of the invention, a 5–10% increase in the yield of fruit and vegetable juice can be attained for the loss of the minimum amount of electric power. The electroplasmolyzer contains a divisible by three number of electrodes 4, 5 connected to the power supply 12 having three phases A, B, C.

The herein disclosed electroplasmolyzer for processing vegetable stock is simple of design, compact, can be readily manufactured, provides for unobstructed passage and good processing of vegetable stock, can be readily assembled in a production line, is reliable and safe in operation. It helps considerably increase the output and efficiency.

What is claimed is:

1. A method of processing vegetable stock, said method comprising:
   establishing an elongated treatment zone having a longitudinally spaced inlet and outlet;
   spacing a plurality of longitudinally extending electrodes in said zone to produce a uniform electric field for complete processing of the vegetable stock and to provide an unobstructed flow path through a central portion of said zone;
   connecting a different phase of a three phase power supply to each of every two adjacent electrodes;
   feeding said vegetable stock into said zone through said inlet and out through said outlet, said vegetable stock being fed under pressure thereby insuring a direct contact of said stock with the surface of said electrodes; and
   switching the power supply on as said vegetable stock is fed into and out of said zone so that the electric field affects the vegetable cells of said stock and changing the cell structure of the vegetable tissue.

2. The method of claim 1, further comprising sealing said zone against atmospheric oxygen so that said vegetable stock avoids being oxidized.

3. The method of claim 1, wherein said electrodes are spaced equidistantly.

4. The method of claim 1, wherein said electrodes are loaded equally to each phase of said three phase power supply.

5. The method of claim 1, wherein said vegetable stock is uniformly distributed between said electrodes.

6. The method of claim 1, wherein the number of electrodes is divisible by three.

7. A method of processing vegetable stock, said method comprising:
   feeding said vegetable stock through an unobstructed flow path of an elongated treatment zone having a plurality of longitudinally extending electrodes, said stock being fed under pressure, thereby insuring a direct contact of the stock with the surface of said electrodes, and
   energizing each of said plurality of electrodes out of phase from an adjacent electrode as said vegetable stock is fed through said zone to produce a uniform electric field in said zone, so that said electric field affects the vegetable cells of said stock and changing the cell structure of the vegetable tissue.

8. A method of processing vegetable stock, said method comprising:
   establishing an elongated controlled treatment zone having a longitudinally spaced inlet and outlet;
   spacing a plurality of longitudinally extending electrodes in said zone to produce a uniform electric field for complete processing of the vegetable stock and to provide a minimal resistance flow path through a central portion of said zone;
   connecting a different phase of a three phase power supply to each of every two adjacent electrodes;
   feeding said vegetable stock into said zone through said inlet and out through said outlet, said vegetable stock being fed under pressure, thereby insuring a direct contact of said vegetable stock with the surface of said electrodes; and
   switching the power supply on as said vegetable stock is fed into and out of said zone so that said electric field affects the vegetable cells of said stock and changing the cell structure of the vegetable tissue.

9. The method of claim 8, further comprising sealing said zone against atmospheric oxygen so that said vegetable stock avoids being oxidized.

10. The method of claim 8, wherein said electrodes are spaced equidistantly.

11. The method of claim 8, wherein said electrodes are loaded equally to each phase of said three phase power supply.

12. The method of claim 8, wherein said vegetable stock is uniformly distributed between said electrodes.

13. The method of claim 8, wherein the number of electrodes is divisible by three.

14. A method of processing vegetable stock, said method comprising:
   feeding said vegetable stock through a minimal resistance flow path of an elongated treatment zone having a plurality of longitudinally extending electrodes, said stock being fed under pressure, thereby insuring a direct contact of the vegetable stock with the surface of said electrodes, and
   energizing each of said plurality of electrodes out of phase from an adjacent electrode as said vegetable stock is fed through said zone to produce a uniform electric field in said zone, so that said electric field affects the vegetable cells of said vegetable stock and changing the cell structure of the vegetable tissue.

* * * * *